(12) United States Patent
Koike et al.

(10) Patent No.: US 7,997,492 B2
(45) Date of Patent: Aug. 16, 2011

(54) IMAGE FORMING APPARATUS, IMAGE FORMING SYSTEM, IMAGE FORMING METHOD, COMPUTER-READABLE MEDIUM AND COMPUTER DATA SIGNAL

(75) Inventors: Kaoru Koike, Saitama (JP); Mitsuru Iioka, Saitama (JP); Yasuo Komatsu, Saitama (JP); Kiyoshi Une, Saitama (JP); Jun Koyatsu, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 604 days.

(21) Appl. No.: 12/121,882

(22) Filed: May 16, 2008

(65) Prior Publication Data

US 2009/0134225 A1    May 28, 2009

(30) Foreign Application Priority Data

Nov. 26, 2007    (JP) .................................. 2007-304734

(51) Int. Cl.
*G06K 19/06*    (2006.01)
(52) U.S. Cl. .................................................. 235/462.25
(58) Field of Classification Search .................... 347/14, 347/19, 105; 235/462.01–462.49
See application file for complete search history.

(56) References Cited

U.S. PATENT DOCUMENTS

| 2003/0169435 | A1* | 9/2003 | Kobayashi et al. | 358/1.2 |
| 2008/0203177 | A1* | 8/2008 | Yumoto | 235/494 |
| 2008/0225319 | A1* | 9/2008 | Takada | 358/1.12 |

FOREIGN PATENT DOCUMENTS

| JP | 63-301073 | A |   | 12/1988 |
| JP | 09245116 | A | * | 9/1997 |
| JP | 11-179894 | A |   | 7/1999 |
| JP | 11-234511 | A |   | 8/1999 |
| JP | 2000115449 | A | * | 4/2000 |
| JP | 2003-145734 | A |   | 5/2003 |
| JP | 2005022383 | A | * | 1/2005 |
| JP | 2006-293916 | A |   | 10/2006 |
| JP | 2007-196574 | A |   | 8/2007 |

OTHER PUBLICATIONS

Notification of Reasons for Refusal issued in a counterpart application No. 2007-304734, dated Feb. 3, 2010.

* cited by examiner

*Primary Examiner* — Thien M. Le
*Assistant Examiner* — Christle I Marshall
(74) *Attorney, Agent, or Firm* — Sughrue Mion, PLLC

(57) ABSTRACT

An image forming apparatus includes a receiving unit, an image forming unit, a determining unit, an analyzing unit and a control unit. The receiving unit receives image data. The image forming unit performs a predetermined image forming process based on the image data received by the receiving unit. The determining unit determines as to whether or not the image data contains a barcode pattern. When the determining unit determines that the image data contains the barcode pattern, the analyzing unit analyzes as to whether a drawing direction of the barcode pattern is a vertical direction or a horizontal direction. The control unit that controls, based on an analyzing result of the analyzing unit, the predetermined image forming process being performed for the barcode pattern by the image forming unit.

14 Claims, 11 Drawing Sheets

IF ACTUAL LINE WIDTH IS OBTAINED WITH EXPOSURE INTENSITY OF 100%, EXPOSURE INTENSITY IS CHANGED TO 80% FOR PRINTING IN ORDER TO OBTAIN LINE WIDTH OF THEORETICAL VALUE

IMAGE FORMING APPARATUS, IMAGE FORMING SYSTEM, IMAGE FORMING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2007-304734 filed Nov. 26, 2007.

BACKGROUND

1. Technical Field

The invention relates to an image forming apparatus, an image forming system, an image forming method, a computer-readable medium and a computer data signal.

2. Related Art

A commodity code such as EAN, JAN and UPC is used to manage commodities, and a distribution code such as ITF-14 and ITF-16 is used to manage cardboard boxes and palettes.

However, with the development of a distribution information management system such as a POS (Point Of Sale) system, an EOS (Electronic Ordering System), and an EDI (Electronic Data Interchange), more advanced commodity management, distribution management, and business management have been demanded. In order to meet such demand, the EAN international organization has developed UCC/EAN-128 as a barcode symbol for distribution compensation, which indicates distribution information or commercial transaction information. This symbol is an application standard based on CODE-128 that is a symbol standard.

Currently, the UCC/EAN-128 barcode (EAN-128: European Article Number 128 which is a barcode standardized by EAN international organization) has been used in a charge payment system of convenience stores as well as a distribution field.

The entire length of the UCC/EAN-128 is required to be less than 60 mm including quiet zones on both sides thereof, and the UCC/EAN-128 is made up of four types of line thicknesses.

Since the UCC/EAN-128 is intended to be used in a distribution field, the UCC/EAN-128 can be used to handle distribution management information and business management information.

The distribution management information specifically refers to a carton number, a shipment container code patch/lot number, date of manufacture, data of package, a warranty term, a sales term, renewal goods, a sequence number, the number of goods, a measurement unit, and the like. In addition, the business management information specifically refers to an order number, a goods consignment number, a location number (delivery point code), a cargo number, a billing source code, a purchase source code, a destination code, a returned goods management number, a service-related number, and the like.

The EAN-128 barcode includes more recorded information than a known barcode such as JAN and has a quite narrow module width. Therefore, when a barcode of EAN-128 is printed, the printing result is required to have higher precision and higher precise color. Accordingly, it is quite difficult to read the EAN-128 barcode with stable reading precision.

That is, if the EAN-128 barcode is printed with a resolution of 600 dpi, in both of white lines (hereinafter, referred to as "white bars") and black lines (hereinafter, referred to as "black bars"), the dot configuration of the barcodes are made up of 4 dots (0.169 mm), 8 dots, 12 dots, and 16 dots, in general. Also, if the EAN-128 barcode is printed with a resolution of 1200 dpi, both of the while bars and the black bars are made up of 9 dots (0.190 mm), 18 dots, 27 dots, and 36 dots, in general. Accordingly, since the line width is considerably narrow and precise, it is difficult to print the EAN-128 barcode. If precision of the printing deteriorates, it becomes difficult to obtain stable reading precision of a barcode reader.

For example, when an electro-photographic printer (such as a laser printer) of a laser beam scanning exposure type is used, the size, shape, output and the like of a spot of a laser beam have a considerable influence on the image quality of narrow lines constituting a barcode.

With regard to horizontal lines (narrow lines perpendicular to a rotation direction of a drum or to a conveyance direction of a printing medium), a latent image is formed by scanning a surface of a charged drum-shape photoreceptor along its axial direction. Therefore, the resultant line width may become thickened due to a curvature of the drum.

Also, with regard to vertical lines (narrow lines parallel to the rotation direction of the drum or to the conveyance direction of the printing medium), the line width may become narrowed because a laser beam power sometimes become weakened when it rises.

Accordingly, a printer (image forming apparatus) for printing a barcode is desired to draw narrow lines, which constitute a barcode, so as to have an optimum width and an optimum density in order to secure stable reading.

However, the related art does not consider a printing performance (reproducibility of a line width/line density of vertical lines and horizontal lines) of an image formation means (such as a printer engine) of a printer. Accordingly, even if the amount of ejected ink or the process condition of image formation is changed, the related art may not be appropriate to print a barcode (that is, a set of narrow lines) with high precision in some cases.

SUMMARY

According to an aspect of the invention, an image forming apparatus includes a receiving unit, an image forming unit, a determining unit, an analyzing unit and a control unit. The receiving unit receives image data. The image forming unit performs a predetermined image forming process based on the image data received by the receiving unit. The determining unit determines as to whether or not the image data contains a barcode pattern. When the determining unit determines that the image data contains the barcode pattern, the analyzing unit analyzes as to whether a drawing direction of the barcode pattern is a vertical direction or a horizontal direction. The control unit controls, based on an analyzing result of the analyzing unit, the predetermined image forming process being performed for the barcode pattern by the image forming unit.

BRIEF DESCRIPTION OF THE DRAWINGS

Exemplary embodiment(s) of the invention will be described in detail based on the following figures, wherein.

DETAILED DESCRIPTION

Figure 1:
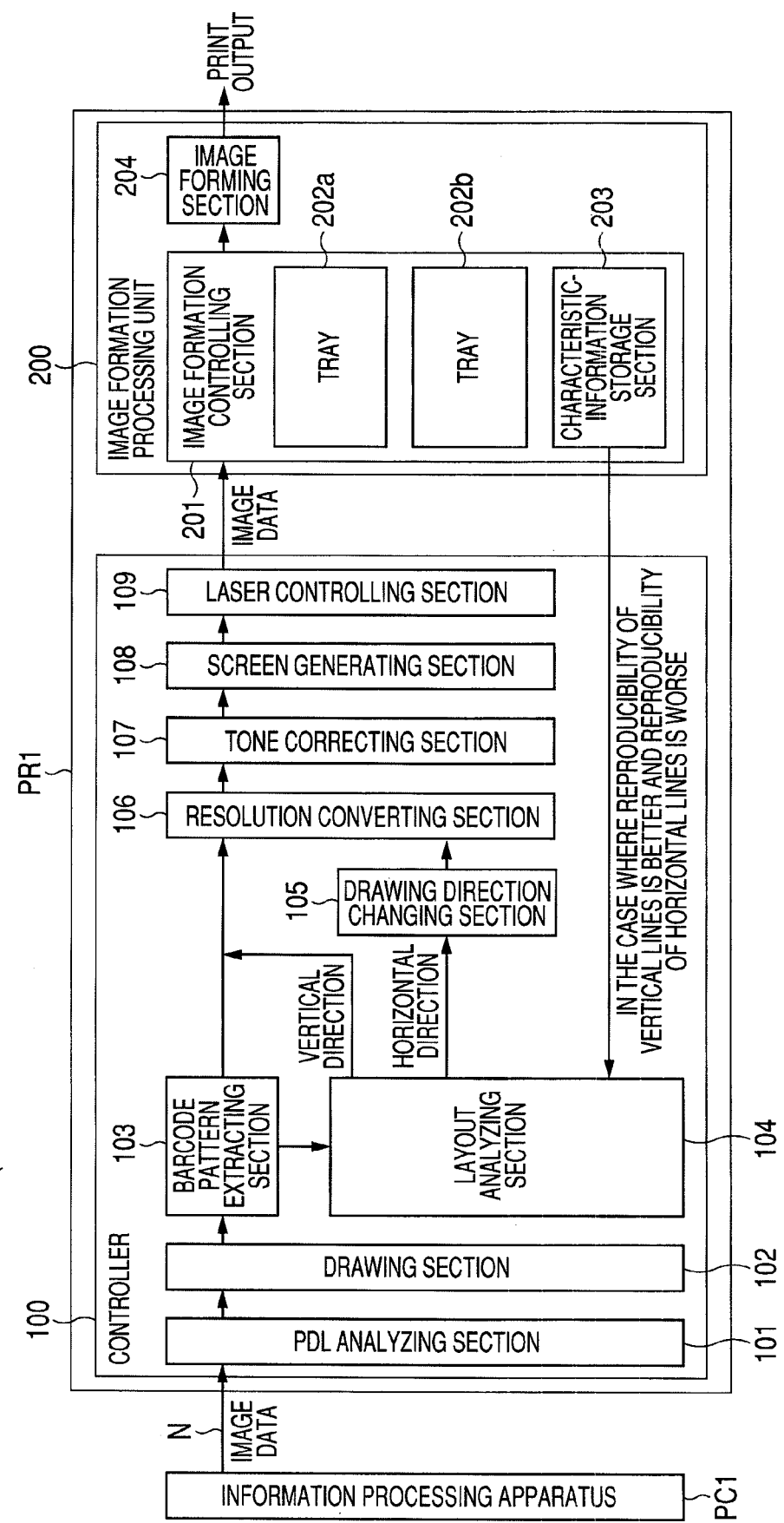
FIG. 1 is a block diagram illustrating the configuration of an image forming system S1 according to a first exemplary embodiment.

Hereinafter, as examples according to the invention, exemplary embodiments will be described in detail with reference to the drawings. In the accompanying drawings, same reference numerals are given to the same elements, and duplicate description will be omitted. Also, the description will be made on the best mode for carrying out the invention, but the invention is not limited thereto.

First Exemplary Embodiment

With reference to FIGS. 1 and 2, an image forming system S1 according to a first exemplary embodiment of the invention will be described.

FIG. 1 is a block diagram illustrating the configuration of the image forming system S1.

As shown in FIG. 1, the image forming system S1 is configured by connecting a printer PR1, which is an example of an image forming apparatus, and an information processing apparatus PC1 implemented by a personal computer or the like through a network N such as a LAN or a USB.

This exemplary embodiment shows the case where one printer PR1 and one information processing apparatus PC1 are connected to each other. However, the invention is not limited thereto, but two or more printers and two or more information processing apparatuses may be connected to each other. Furthermore, an image input apparatus (such as a scanner) or the like having a network function may be connected thereto.

A type of the printer PR1 is not particularly limited, but may be any one of a laser printer, a full-color printer, a multifunction device, an ink jet printer, and the like. In this exemplary embodiment, it is assumed that the printer PR1 is a laser printer.

The printer PR1 mainly includes a controller (control unit) 100 for controlling overall the printer PR1 and an image formation processing section 200 for forming (printing) an image based on image data under control of the controller 100.

The controller 100 includes: a PDL analyzing section 101 that receives and analyzes PDL (Printer Control Language) data which includes image data transmitted from the information processing apparatus PC1 through the network N; a drawing section 102 that expands vector data (image data) included in the PDL data into RGB rasterization data of one page (rasterization image or bitmap data); a barcode pattern extracting section 103 that extracts a barcode pattern based on the RGB rasterization data; a layout analyzing section 104 that analyzes the layout of the barcode pattern; a drawing direction changing section 105 that changes a drawing direction of the barcode pattern based on an analysis result of the layout analyzing section 104; a resolution converting section 106 that converts a resolution; a tone correcting section 107 that corrects tone; a screen generating section 108 that adjusts a dot density; and a laser controlling section 109 that controls ON and OFF of a laser.

Also, the controller 100 may be implemented by a microcomputer, and the functions of the respective sections may be implemented by predetermined software.

The image formation processing section 200 includes an image formation controlling section 201 that receives and processes the image data output from the controller 100, and an image forming section 204 that executes image formation (printing) for a printing sheet (printing medium).

Also, the image formation controlling section 201 includes: trays 202a and 202b that store printing sheets in a longitudinal direction and a transverse direction, respectively; and a characteristic-information storage section 203 that includes a non-volatile memory for storing information relating to a narrow-line drawing performance (narrow-line drawing characteristic) of the image forming section 204.

Figure 7:
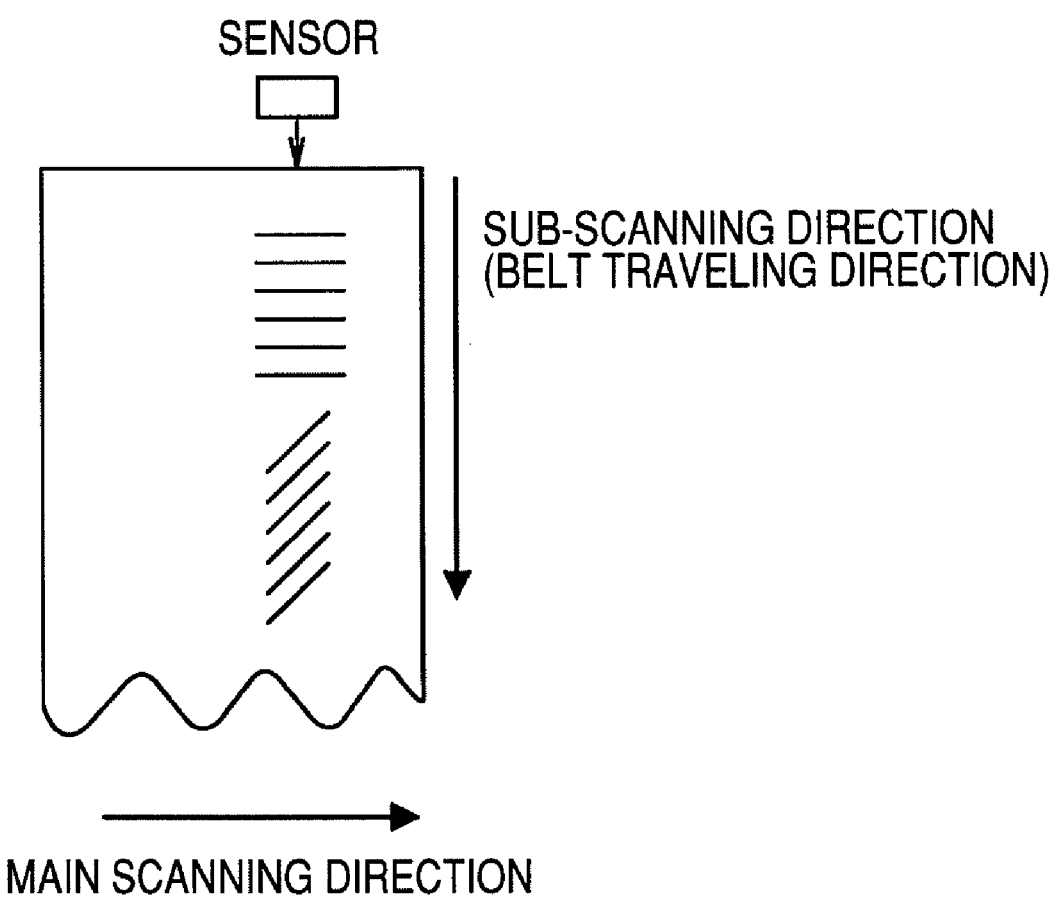
FIG. 7 is a diagram for explaining a state of narrow-line images formed on an intermediate transfer belt when reproducibility of narrow lines (drawing performance) is detected by an image sensor.

An image sensor that includes an optical sensor such as a photo diode or a photo transistor, or a CCD (Charge Coupled Device Image Sensor) may be arranged near the photoreceptor drum or an intermediate transfer belt included in the image forming section 204 so as to optically detect a narrow-line image (toner image or the like) that is formed during any one step of an image forming process. For example, FIG. 7 shows the optical sensor is provided near the intermediate transfer belt to optically detect a toner image of a barcode that is formed on the intermediate transfer belt during the image forming process.

In this case, reproducibility of the narrow lines is determined based on the narrow-line image detected by the image sensor or the like, and information of the drawing performance (the drawing characteristic) of the image forming section 204 can be collected based on this determination result.

Subsequently, the information of the collected drawing performance (the drawing characteristic) may be stored in the characteristic-information storage section 203.

It should be noted that the invention is not limited to the above configuration. For example, the information of the drawing performance (the drawing characteristic) of the image forming section 204 may be collected using the image sensor or the like during a manufacturing process or an assembling process of the printer PR1, and the information of the drawing performance (the drawing characteristic) may be stored in the characteristic-information storage section 203 in advance.

Alternatively, on the basis of the detection result of the narrow-line image obtained by the image sensor or the like, it may be determined as to whether or not the barcode pattern is included in the PDL data, using a technique such as pattern matching.

Next, an operation of the image forming system S1 according to this exemplary embodiment will be described.

A first example of the operation will be described on the assumption that the following information has been collected and stored in the characteristic-information storage section

203. That is, the information indicates that the image forming section 204 has such a drawing performance (drawing characteristic) that reproducibility of vertical lines (narrow lines parallel to the rotation direction of the drum or to the conveyance direction of the printing medium) is better than that of horizontal lines (narrow lines perpendicular to the rotation direction of the drum or to the conveyance direction of the printing medium).

First, the barcode pattern extracting section 103 extracts the barcode pattern based on the PDL data, which includes the image data transmitted from the information processing apparatus PC1 through the network N.

Subsequently, when the extracted barcode pattern is identical with a predetermined barcode pattern (for example, EAN-128 barcode, but the predetermined barcode is not limited to EAN-128 barcode), the layout analyzing section 104 analyzes the layout of the barcode pattern.

Figure 2A:
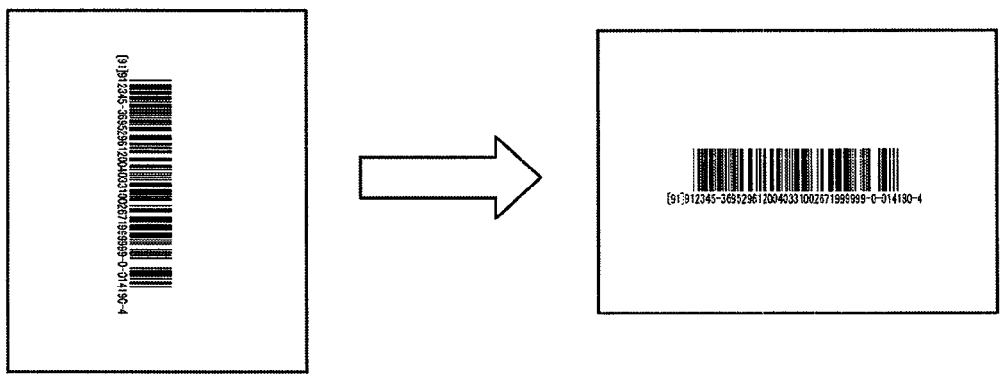
FIGS. 2A and 2B are diagrams for explaining examples of layout conversion of a barcode pattern.

When the analysis result of the layout indicates the barcode pattern of "the horizontal lines", the drawing direction is changed (in the example shown in FIG. 2A, the drawing direction rotates by 90° counterclockwise).

Subsequently, the data having the converted layout is processed through the resolution converting section 106, the tone correcting section 107, the screen generating section 108, and the laser controlling section 109, and is printed out with the tray 202b, for example, being selected.

In this way, the barcode pattern can be printed in a state where the barcode pattern has been converted into the vertical lines, which are better than the horizontal lines in the reproducibility of the narrow lines. Therefore, precision of the barcode pattern can be improved in accordance with the state of the printer PR1.

On the other hand, when the analysis result of the layout indicates the barcode pattern of "the vertical lines", the printing is performed under a normal printing condition without the drawing direction being changed.

Also, if it is determined that the barcode pattern is not included in the PDL data, the printing is performed under the normal printing condition without the drawing direction being changed.

An another example of the operation will be described below with the assumption that the following information has been collected and stored in the characteristic-information storage section 203. That is, the information indicates that the image forming section 204 such a drawing performance (drawing characteristic) that reproducibility of horizontal lines (the narrow lines perpendicular to the rotation direction of the drum or to the conveyance direction of the printing medium) is better than that of vertical lines (the narrow lines parallel to the rotation direction of the drum or to the conveyance direction of the printing medium).

First, as in the foregoing description, the barcode pattern extracting section 103 extracts a barcode pattern based on the PDL data which includes the image data transmitted from the information processing apparatus PC1 through the network N.

Subsequently, when the extracted barcode pattern is identical with the predetermined barcode pattern, the layout analyzing section 104 analyzes the layout of the barcode pattern.

Figure 2B:
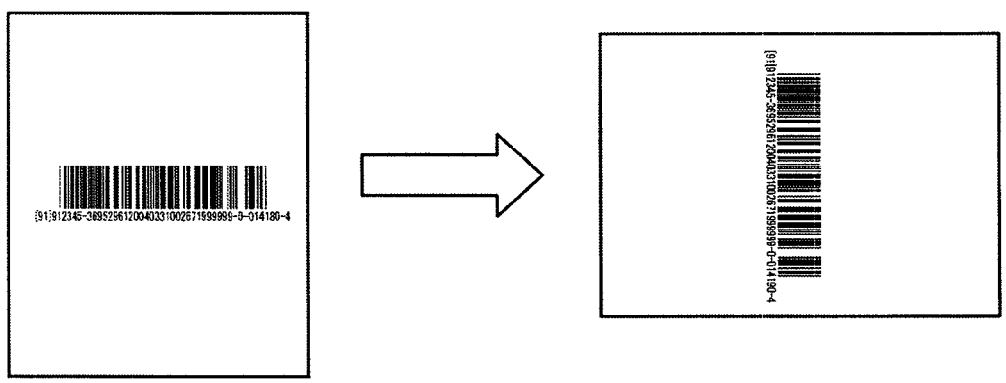

When the analysis result of the layout is the barcode pattern of "the vertical lines", the drawing direction is changed (in the example shown in FIG. 2B, the drawing direction rotates by 90° clockwise).

Subsequently, the data of the converted layout is processed through the resolution converting section 106, the tone correcting section 107, the screen generating section 108, and the laser controlling section 109, and is printed with the tray 202a, for example, being selected.

In this way, the barcode pattern can be printed in a state where the barcode pattern has been converted into the horizontal lines, which are better than the vertical lines in the reproducibility of the narrow lines. Therefore, the precision of the barcode pattern can be improved in accordance with the state of the printer PR1.

On the other hand, if the analysis result of the layout is the barcode pattern of "the horizontal lines", the printing is performed under the normal printing condition without the drawing direction being changed.

Also, if it is determined that the barcode pattern is not included in the PDL data, the printing is performed under the normal printing condition without the drawing direction being changed.

Although not particularly limited, it is desirable that the barcode pattern printed by the image forming section 204 is controlled so as to have a quality of a grade B or better in Table 1 (a grade representation of ANSI X3.182 which is a barcode quality guideline of the ANSI specification) described below.

TABLE 1

GRADE PRESENTATION OF PRINT QUALITY (ANSI X3.182)

| GRADE | CONTENTS |
|---|---|
| A | Highest quality where a reader can read symbols just by single scanning |
| B | Quality where a reader can read symbols almost by single scanning and can read the symbols by re-scanning |
| C | Quality where a reader can read symbols by increasing number of times of re-scanning to be larger than grade B |
| D | Quality where a reader can read symbols if the symbols pass plural scanning lines |
| F | Quality where a reader cannot read symbols and this quality cannot be used in a system |

Second Exemplary Embodiment

Figure 3:
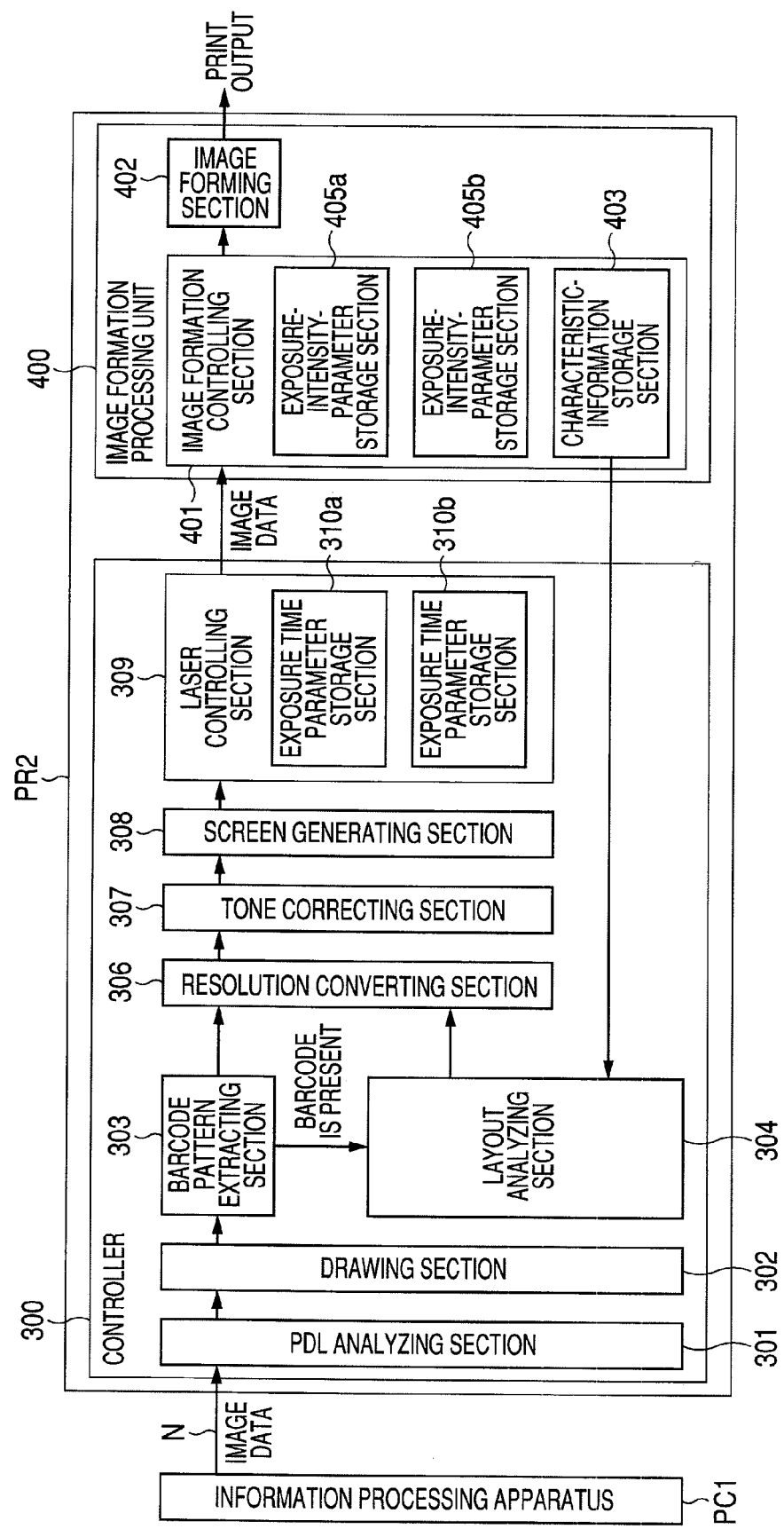
FIG. 3 is a block diagram illustrating the configuration of an image forming system S2 according to a second exemplary embodiment.

With reference to FIG. 3, an image forming system S2 according to a second exemplary embodiment of the invention will be described.

FIG. 3 is a block diagram illustrating the configuration of the image forming system S2.

As shown in FIG. 3, the image forming system S2 is implemented by connecting a printer PR2, which is an example of an image forming apparatus, and an information processing apparatus PC1 including a personal computer or the like through a network N such as a LAN or a USB.

In this exemplary embodiment, one printer PR2 and one information processing apparatus PC1 are connected to each other. However, the invention is not limited thereto, but two or more printers and two or more information processing apparatuses may be connected to each other. Also, an image input apparatus (such as a scanner) or the like having a network function may be connected thereto.

In this exemplary embodiment, it is assumed that the printer PR2 is a laser printer.

The printer PR2 mainly includes a controller (control unit) 300 for controlling overall the printer PR2 and an image formation processing section 400 for forms (prints) an image based on image data under control of the controller 300.

The controller 300 includes: a PDL analyzing section 301 that receives and analyzes PDL data which includes image data transmitted from the information processing apparatus PC1 through the network N; a drawing section 302 that expands vector data (image data) included in the PDL data into RGB rasterization data of one page (rasterization image or bitmap data); a barcode pattern extracting section 303 that extracts a barcode pattern based on the RGB rasterization data; a layout analyzing section 304 that analyzes the layout of the barcode pattern; a resolution converting section 306 that converts a resolution based on the analysis result of the layout analyzing section 304; a tone correcting section 307 that corrects tone; a screen generating section 308 that adjusts a dot density; and a laser controlling section 309 that controls ON and OFF of a laser.

The laser controlling section 309 includes exposure-time-parameter storage sections 310a and 310b that include non-volatile memories for storing parameters of ON/OFF timing of the laser output device included in the image forming section 402.

Although not particularly limited, for example, the exposure-time-parameter storage section 310a stores, in a table form, an exposure time parameter of a laser for normal print that is performed when image data does not include a barcode pattern. Also, the exposure-time-parameter storage section 310b stores, in a table format, an exposure time parameter (or pulse width parameter) of the laser, which corresponds to the case where image data includes a barcode pattern formed of "vertical lines".

Also, the controller 300 may be implemented by a microcomputer, and the functions of the respective sections may be implemented by predetermined software.

The image formation processing section 400 includes an image formation controlling section 401 that receives and processes the image data output from the controller 300, and an image forming section 402 that forms (prints) an image on a printing sheet (printing medium).

Also, the image formation controlling section 401 includes exposure-intensity-parameter storage sections 405a and 405b, which include non-volatile memories for storing a parameter relating to adjustment of an output of the laser output device; and a characteristic-information storage section 403, which includes a non-volatile memory for storing information of a narrow-line drawing performance (narrow-line drawing characteristic) of the image forming section 402.

Although not particularly limited, for example, the exposure-intensity-parameter storage section 405a stores, in a table format, an exposure intensity parameter of the laser for the normal print that is performed when image data does not include a barcode pattern. Also, the exposure-intensity-parameter storage section 405b stores, in a table format, an exposure intensity parameter of the laser, which corresponds to the case where the image data includes a barcode pattern formed of "horizontal lines".

Although not shown in the figure, an image sensor which includes an optical sensor or a CCD may be arranged near a photoreceptor drum or an intermediate transfer belt included in the image forming section 402 in order to optically detect a narrow-line image (toner image or the like) formed during one step of an image forming process. For example, FIG. 7 shows the optical sensor is provided near the intermediate transfer belt to optically detect a toner image of a barcode that is formed on the intermediate transfer belt during the image forming process.

Reproducibility of the narrow lines is determined based on the narrow-line image detected by the image sensor or the like, and information of the drawing performance (the drawing characteristic) of the image forming section 402 can be collected based on this determination result.

Subsequently, the information of the collected drawing performance (the drawing characteristic) may be stored in the characteristic-information storage section 403.

It should be noted that the invention is not limited to the above configuration. For example, the information of the drawing performance (the drawing characteristic) of the image forming section 402 may be collected using the image sensor or the like during a manufacturing process or an assembling process of the printer PR2, and the information of the drawing performance (the drawing characteristic) may be stored in the characteristic-information storage section 403 in advance.

Alternatively, on the basis of the detection result of the narrow-line image obtained by the image sensor or the like, it may be determined as to whether or not the barcode pattern is included in the PDL data, using a technique such as pattern matching.

Next, an operation of the image forming system S2 according to this exemplary embodiment will be described.

The example of the operation will described on the assumption that the following information has been collected and stored in the characteristic-information storage section 403. That is, the information indicates that the image forming section 402 has such a drawing performance (drawing characteristic) that none of (i) the vertical lines (narrow lines parallel to the rotation direction of the drum or to the conveyance direction of the printing medium) and (ii) the horizontal lines (narrow lines perpendicular to the rotation direction of the drum or to the conveyance direction of the printing medium) satisfies a predetermined condition.

That is, it is assumed that if the second exemplary embodiment is not applied, qualities of barcode patterns drawn in the vertical and horizontal directions, respectively, belong to any of C grade to F grade shown in the table 1 of the first exemplary embodiment. In other words, in this exemplary embodiment, the predetermined condition is that a quality of a barcode formed by the printer PR2 is grade A or grade B.

First, the barcode pattern extracting section 303 extracts the barcode pattern based on the PDL data which includes the image data transmitted from the information processing apparatus PC1 through the network N.

Subsequently, when the extracted barcode pattern is identical with a predetermined barcode pattern (for example, EAN-128 barcode, but the predetermined barcode is not limited to EAN-128 barcode), the layout analyzing section 304 analyzes the layout of the barcode.

For example, if the analysis result of the layout is the barcode pattern of "the vertical lines", the barcode pattern is processed through the resolution converting section 306, the tone correcting section 307, and the screen generating section 308. Then, the laser controlling section 309 reads, from the exposure-time-parameter storage section 310b, the exposure time parameter (or the pulse width parameter) of the laser, which corresponds to the case where the image data includes the barcode pattern formed of "the vertical lines". The laser controlling section 309 controls the laser output device of the image forming section 402 based on the read exposure time parameter to print.

Figure 4A:
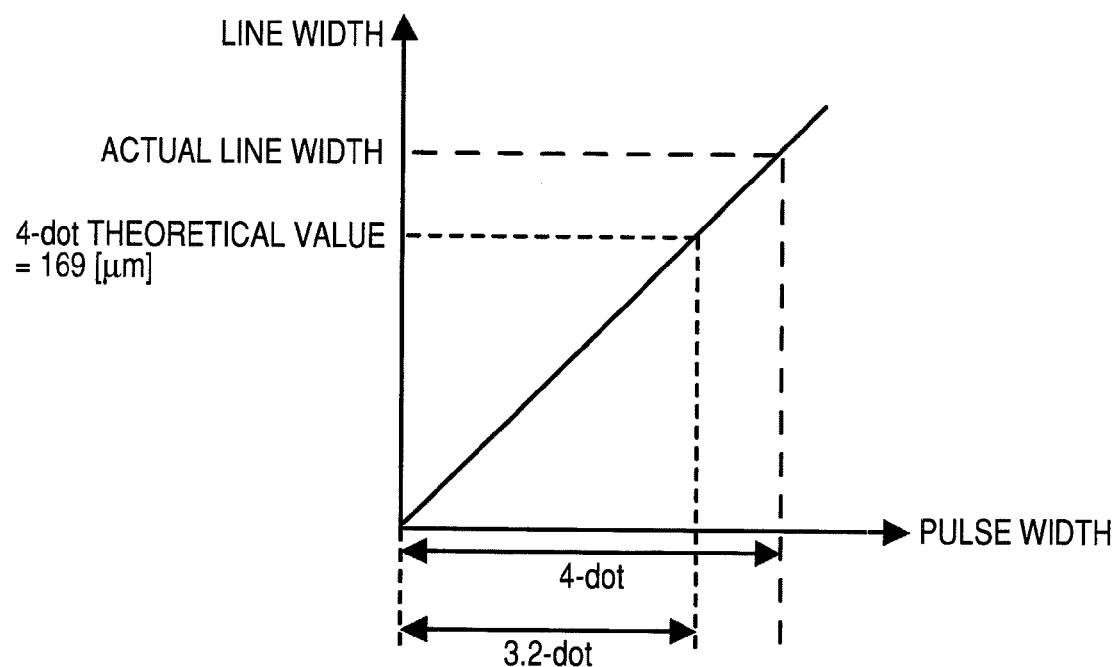
FIGS. 4A and 4B are diagrams for explaining a relationship between a line width and a pulse width.
Figure 4B:
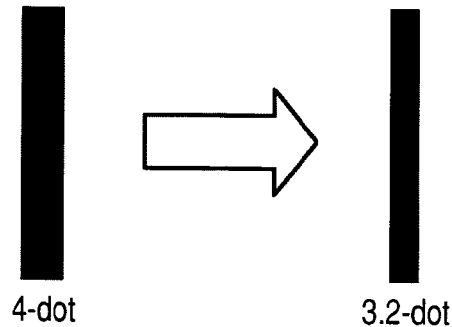

In this case, if a line width which is desired to obtain as the narrow line (vertical line) of the barcode pattern is, for example, 4 dots, the parameter is adjusted so as to apply a laser beam of a theoretical value (169 μm: 3.2 dots) which corresponds to 4 dots as shown in a graph of FIG. 4A.

In this way, even if it is difficult for the printer PR2 to print an image of narrow lines (vertical lines) due to its characteristic, a barcode pattern of an improved print quality (that is, the quality of B grade or higher in Table 1) can be printed by adjusting the exposure time (or the pulse width) of the laser.

On the other hand, if the analysis result of the layout is the barcode pattern of "the horizontal lines", for example, the barcode pattern is processed through the resolution converting section 306, the tone correcting section 307, the screen generating section 308, and the laser controlling section 309. Then, the image formation controlling section 401 reads from the parameter storage section 405b the exposure intensity parameter of the laser, which corresponds to the case where the image data includes the barcode pattern formed of "the horizontal lines". The image formation controlling section 401 controls the laser output device of the image forming section 402 based on the read exposure intensity parameter, to print.

Figure 5A:
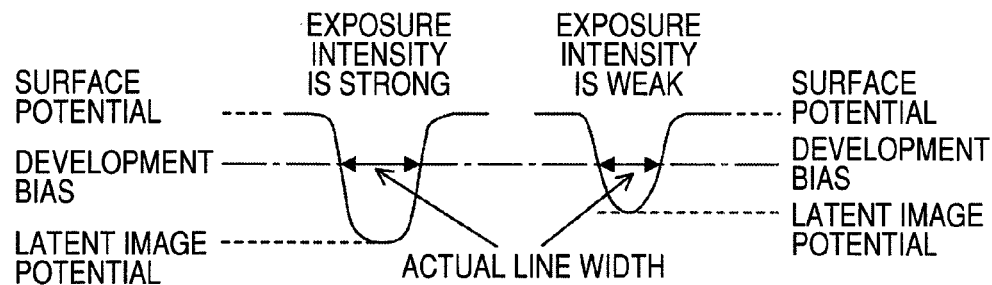
FIGS. 5A and 5B are diagrams for explaining a relationship between a line width and an exposure intensity.

FIG. 5A shows a relationship among a surface potential, a development bias, and a latent image potential.

As shown in FIG. 5A, the width of the development bias, which is the practical line width, varies depending on the exposure intensity.

Figure 5B:
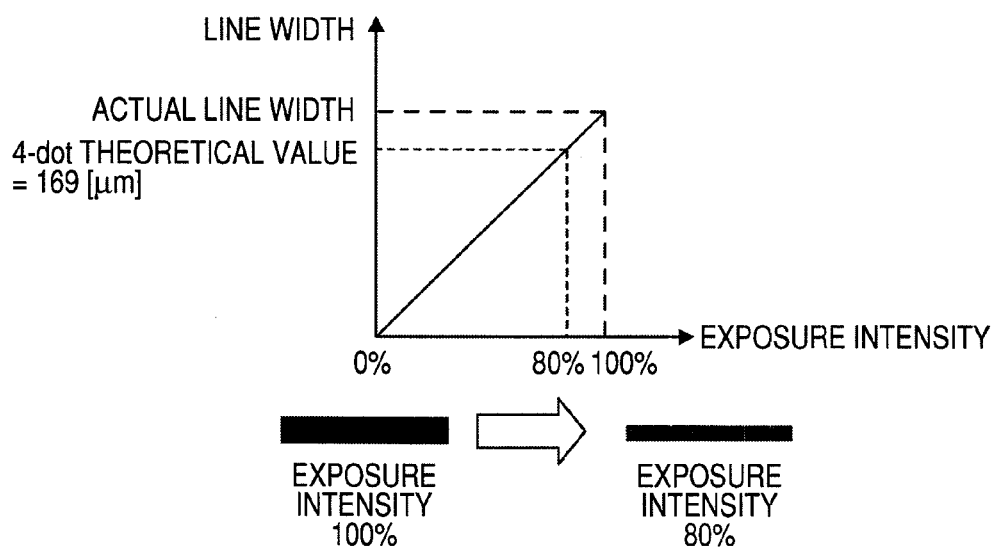

Based on this principle, as shown in FIG. 5B, if the line width which is desired to obtain as the narrow line (the horizontal line) of the barcode pattern is, for example, 4 dots, the parameter is adjusted so as to apply a laser beam of an exposure intensity of the theoretical value (169 μm: 80%) corresponding to 4 dots.

In this way, even if it is difficult for the printer PR2 to print an image of the narrow lines (the horizontal lines) due to the printer characteristic, the barcode pattern of an improved print quality (that is, the quality of B grade or higher in Table 1) can be printed by adjusting the exposure intensity of the laser.

Also, if it is determined that the PDL data does not include the barcode pattern, parameters are read from the exposure-time-parameter storage section 310a and the exposure-intensity-parameter storage section 405a to perform the normal printing.

Third Exemplary Embodiment

Figure 6:
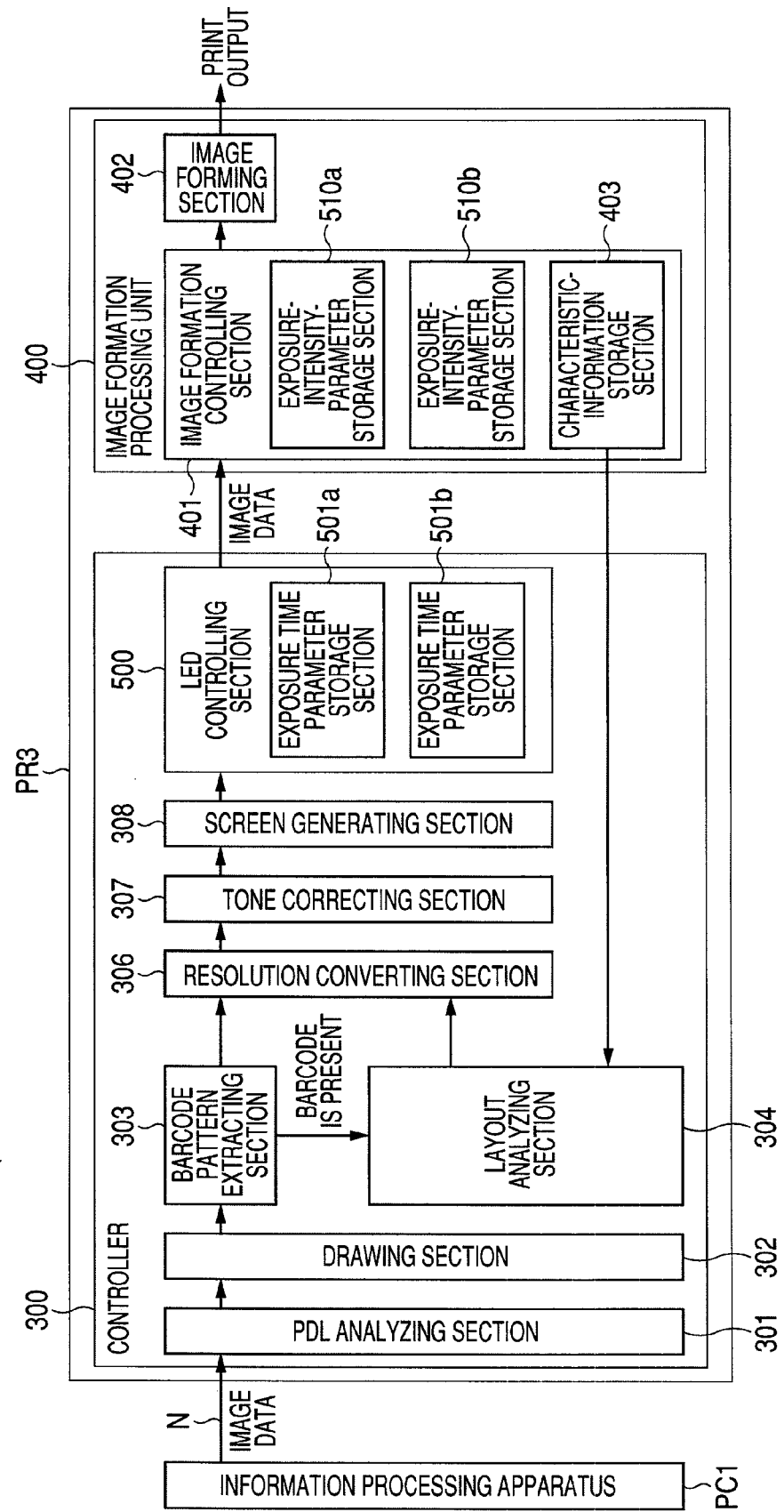
FIG. 6 is a block diagram illustrating the configuration of an image forming system S3 according to a third exemplary embodiment.

With reference to FIG. 6, an image forming system S3 according to a third exemplary embodiment of the invention will be described.

FIG. 6 is a block diagram illustrating the configuration of the image forming system S3.

As shown in FIG. 6, the image forming system S3 is configured by connecting a printer PR3 which is an example of an image forming apparatus and an information processing apparatus PC1 which is implemented by a personal computer or the like through a network N such as a LAN or a USB.

In this exemplary embodiment, one printer PR3 and one information processing apparatus PC1 are connected to each other. However, the invention is not limited thereto, but two or more printers and two or more information processing apparatuses may be connected to each other. Also, an image input apparatus (such as a scanner) or the like having a network function may be connected thereto.

In this exemplary embodiment, it is assumed that the printer PR3 is an LED printer.

The configuration of the printer PR3 is similar to that of the printer PR2 according to the second exemplary embodiment. Accordingly, the same reference numerals are given to the same elements and the duplicate description will be omitted.

The printer PR3 is different from the printer PR2 in that an LED controlling section 500 for controlling an LED array as an exposure device included in the image forming section 402 is provided in place of the laser controlling section 309 because of the difference of an exposure light source.

The LED controlling section 500 includes exposure-time-parameter storage sections 501a and 501b which include nonvolatile memories for storing parameters relating to ON/OFF timing of the LED output device included in the image forming section 402.

Although not particularly limited, for example, the exposure-time-parameter storage section 501a stores, in a table format, an exposure time parameter of the LED for a normal print, which is performed when image data does not include a barcode pattern. Also, the exposure-time-parameter storage section 501b stores, in a table format, an exposure time parameter (or pulse width parameter) of the LED, which corresponds to the case where the image data includes the barcode pattern formed of "horizontal lines".

The image formation controlling section 401 includes exposure-intensity-parameter storage sections 510a and 510b which include non-volatile memories for storing parameters relating to adjustment of an output of the LED array; and a characteristic-information storage section 403 which includes a non-volatile memory for storing information relating to a narrow-line drawing property (narrow-line drawing characteristic) of the image forming section 402.

Although not particularly limited, for example, the exposure-intensity-parameter storage section 510a stores in a table format an exposure intensity parameter of the LED array for the normal print, which is performed when the image data does not include the barcode pattern. Also, the exposure-intensity-parameter storage section 510b stores in a table format an exposure intensity parameter of the LED array, which corresponds to the case where the image data includes the barcode pattern formed of "vertical lines".

Next, an operation of the image forming system S3 according to this exemplary embodiment will be described.

The example of the operation will described on the assumption that the following information has been collected and stored in the characteristic-information storage section 403. That is, this information indicates that the image forming section 402 has such a drawing performance (drawing characteristic) that none of (i) the vertical lines (narrow lines parallel to the rotation direction of the drum or to the conveyance direction of the printing medium) and (ii) the horizontal lines (narrow lines perpendicular to the rotation direction of the drum or to the conveyance direction of the printing medium) satisfies a predetermined condition.

That is, it is assumed that if the third exemplary embodiment is not applied, qualities of barcode patterns drawn in the vertical and horizontal directions, respectively, belong to any of C grade to F grade shown in the table 1 of the first exemplary embodiment. In other words, in this exemplary embodiment, the predetermined condition is that a quality of a barcode formed by the printer PR3 is grade A or grade B.

First, the barcode pattern extracting section 303 extracts the barcode pattern based on the PDL data which includes the image data transmitted from the information processing apparatus PC1 through the network N.

Subsequently, when the extracted barcode pattern is identical with a predetermined barcode pattern (for example, EAN-128 barcode, but the predetermined barcode is not limited to EAN-128 barcode), the layout analyzing section 304 analyzes the layout of the barcode pattern.

For example, if the analysis result of the layout is the barcode pattern of "the horizontal lines", the barcode pattern is processed through the resolution converting section 306, the tone correcting section 307, and the screen generating section 308. Then, the LED controlling section 500 reads from the exposure-time-parameter storage section 501b the exposure time parameter (or the pulse width parameter) of the LED array, which corresponds to the case where the image data includes the barcode pattern formed of "the horizontal lines". The LED controlling section 500 controls the LED array of the image forming section 402 based on the read exposure time parameter to print.

In this way, even if it is difficult for the printer PR3 to print an image of the narrow lines (the horizontal lines) due to printer characteristic, the barcode pattern of an improved print quality (that is, the quality of B grade or higher in Table 1) can be printed by adjusting the exposure time (or the pulse width) of the LED array.

On the other hand, if the analysis result of the layout is the barcode pattern of "the vertical lines", for example, the barcode pattern is processed through the resolution converting section 306, the tone correcting section 307, the screen generating section 308, and the LED controlling section 500. Then, the image formation controlling section 401 reads from the exposure-time-parameter storage section 501b the exposure intensity parameter of the laser, which corresponds to the case where the image data includes the barcode pattern formed of "the vertical lines". The image formation controlling section 401 controls the LED array of the image forming section 402 based on the read exposure intensity parameter to print.

In this way, even if it is difficult for the printer PR3 to print an image of the narrow lines (the vertical lines) due to the printer characteristic, the barcode pattern of an improved print quality (that is, the quality of B grade or higher in Table 1) can be printed by adjusting the exposure intensity of the LED array.

Also, if it is determined that the PDL data does not include the barcode pattern, parameters are read from the exposure-time-parameter storage section 501a and the exposure-intensity-parameter storage section 510a to perform the normal printing.

In the printer PR2 (the laser printer) according to the second exemplary embodiment and the printer PR3 (the LED printer) according to the third exemplary embodiment, the vertical lines and the horizontal lines of the barcode pattern are difference in a process of switching parameters. This is because the LED array can control its exposure time only in a sub-scanning direction (a traveling direction of an intermediate transfer belt) while the laser beam can control its exposure time only in a main scanning direction (see FIG. 7).

Fourth Exemplary Embodiment

With reference to FIGS. 8 to 11, an image forming system S4 according to a fourth exemplary embodiment of the invention will be described below. The fourth exemplary embodiment is similar to a combination of the first and second exemplary embodiments.

Figure 8:
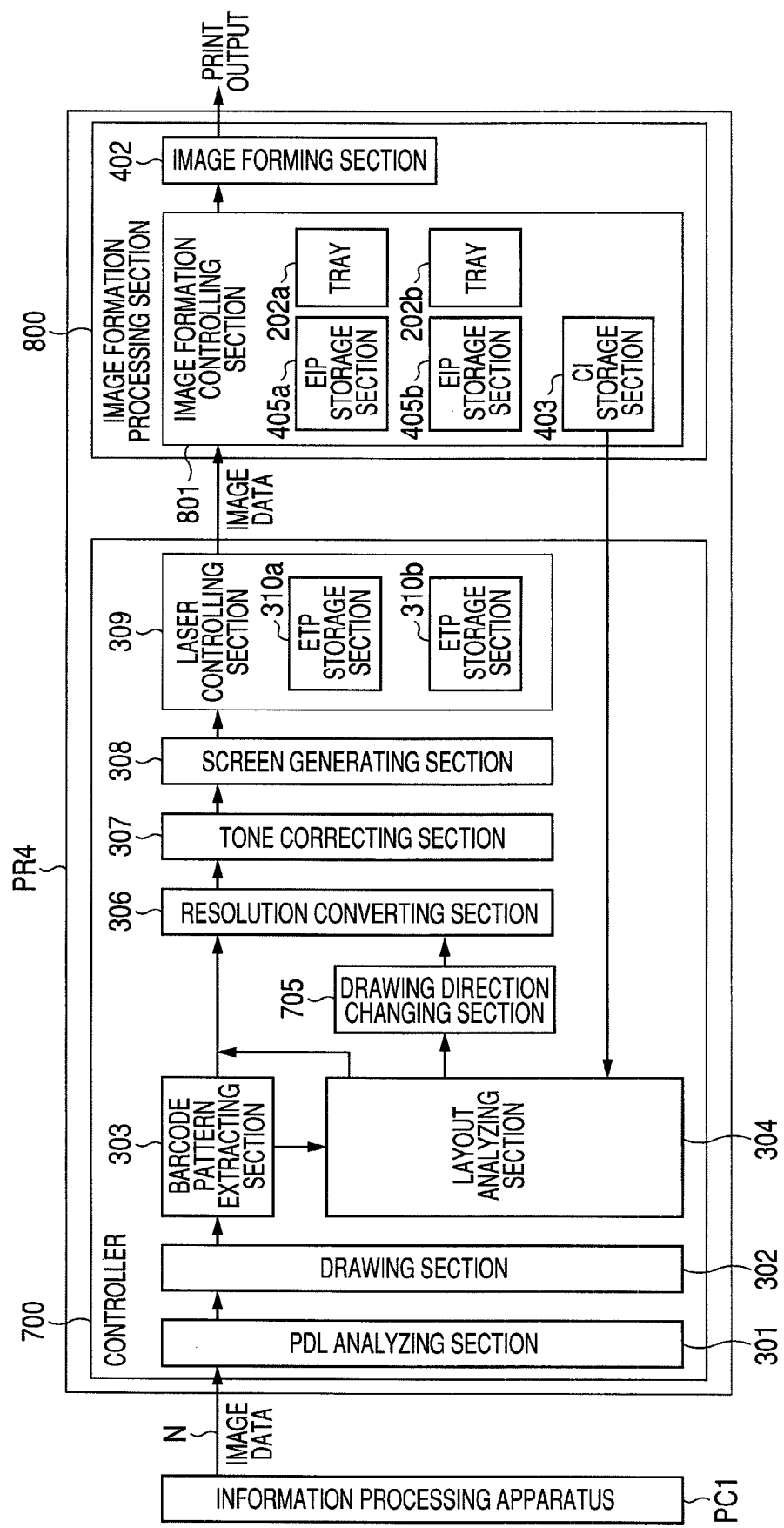
FIG. 8 is a block diagram illustrating the configuration of the image forming system S4.

FIG. 8 is a block diagram illustrating the configuration of the image forming system S4. As shown in FIG. 8, the image forming system S4 is implemented by connecting a printer PR4, which is an example of an image forming apparatus, and an information processing apparatus PC1 including a personal computer or the like through a network N such as a LAN or a USB.

In this exemplary embodiment, one printer PR4 and one information processing apparatus PC1 are connected to each other. However, the invention is not limited thereto, but two or more printers and two or more information processing apparatuses may be connected to each other. Also, an image input apparatus (such as a scanner) or the like having a network function may be connected thereto.

In this exemplary embodiment, it is assumed that the printer PR4 is a laser printer and that this layer printer controls an exposure time of a laser beam in a main scanning direction, but cannot control the exposure time of the laser beam in a sub-scanning direction (which is perpendicular to the main scanning direction and is parallel to a traveling direction of an intermediate transfer belt; see FIG. 7).

The configuration of the printer PR4 is similar to the combination of the printer PR1 according to the first exemplary embodiment and the printer PR2 according to the second exemplary embodiment. Accordingly, the same reference numerals are given to the same elements and the duplicate description thereon will be omitted.

As compared with the printer PR2 of the second exemplary embodiment, the printer PR4 further includes a drawing direction changing section 705, and trays 202a and 202b in an image formation controlling section 801. The drawing direction changing section 705 changes a drawing direction of a barcode pattern based on an analysis result of the layout analyzing section 304. The trays 202a and 202b store printing sheets in a longitudinal direction and a transverse direction, respectively.

Next, an operation of the image forming system S4 according to this exemplary embodiment will be described with reference to flow charts shown in FIGS. 9 to 11.

When PDL data containing image data is transmitted from the information processing apparatus PC1 through the network N, the PDL data is processed by the PDL analyzing section 301 and the drawings section 302. Then, the barcode pattern extracting section 303 attempts to extract a barcode pattern from the RGB rasterization data (step S101). The barcode pattern extracting section 303 may extract a barcode pattern by the pattern matching method as described in the first and second exemplary embodiments or by analyzing a certain control command which is attached to the image data and which indicates as to whether or not the image data contains a barcode pattern.

Figure 11:
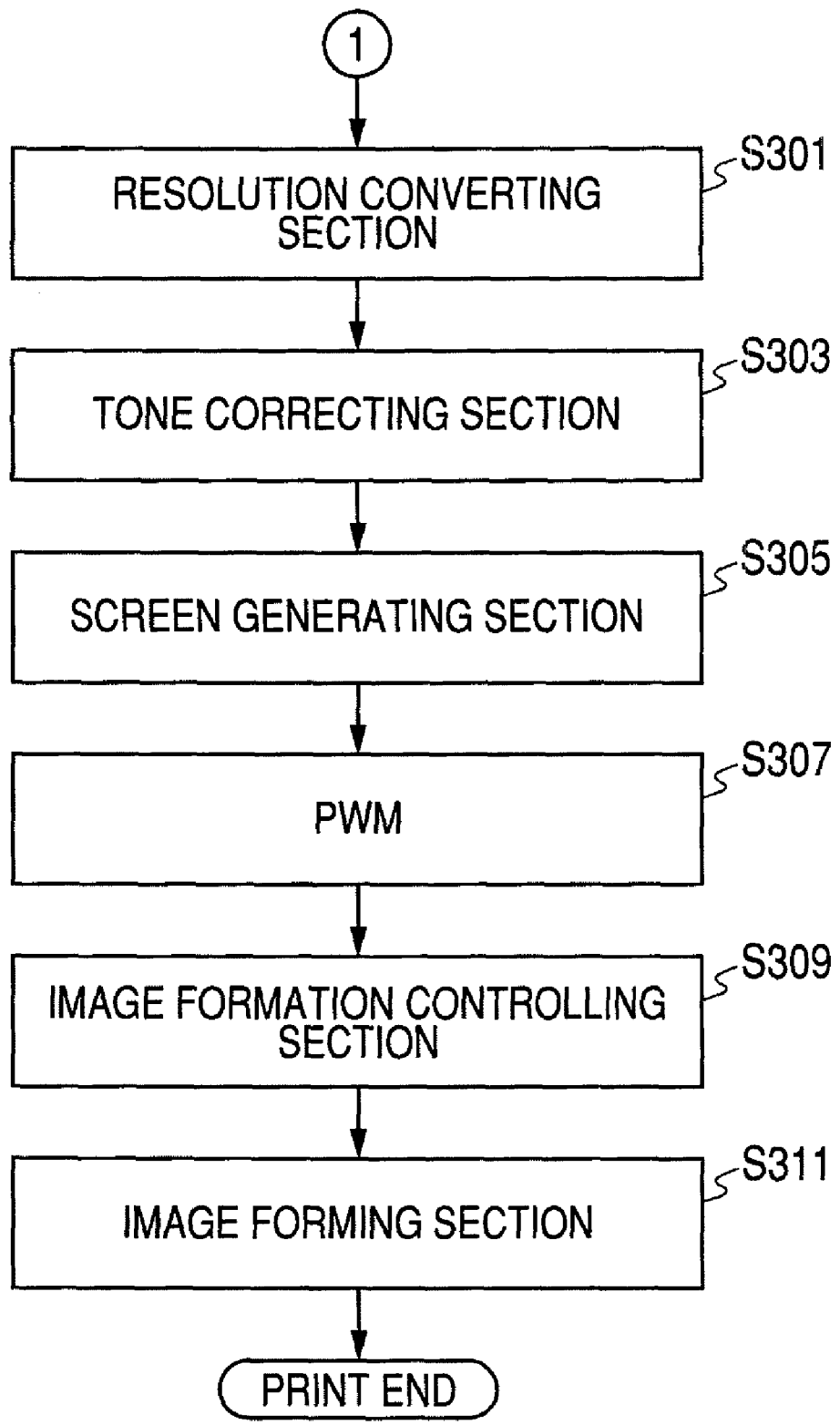
FIG. 11 is a flow chart showing further another part of the operation of the image forming system S4 (normal image forming process) according to the fourth exemplary embodiment.

If the barcode pattern extracting section 303 determines that the image data contains no barcode pattern (No in step S101), the process proceeds to FIG. 11 (which may be referred to as a "normal image forming process). The normal image forming process is set in advance to, for example, image data containing no barcode pattern. The resolution converting section 306 changes a resolution of the image data (step S301), the tone correcting section 307 corrects tone of the image data (step S303), and the screen generating section 308 adjusts a dot density of the image data (step S305). Then, the laser controlling section 309 reads the exposure time parameter for the normal print from the exposure-time-parameter storage section 310a (step S307). Also, the image formation controlling section 801 reads the exposure intensity parameter for the normal print from an exposure intensity parameter storage section 405a (step S309). Then, the image forming section 402 forms an image on a recording medium by controlling its laser output device based on (i) the image data processed by the screen generating section 308, (ii) the exposure time parameter read out by the laser controlling section 309 (the exposure time parameter for the normal print) and (iii) the exposure intensity parameter read out by the image formation controlling section 801 (the exposure intensity parameter for the normal print; step S311), and then the printing process is completed.

Figure 9:
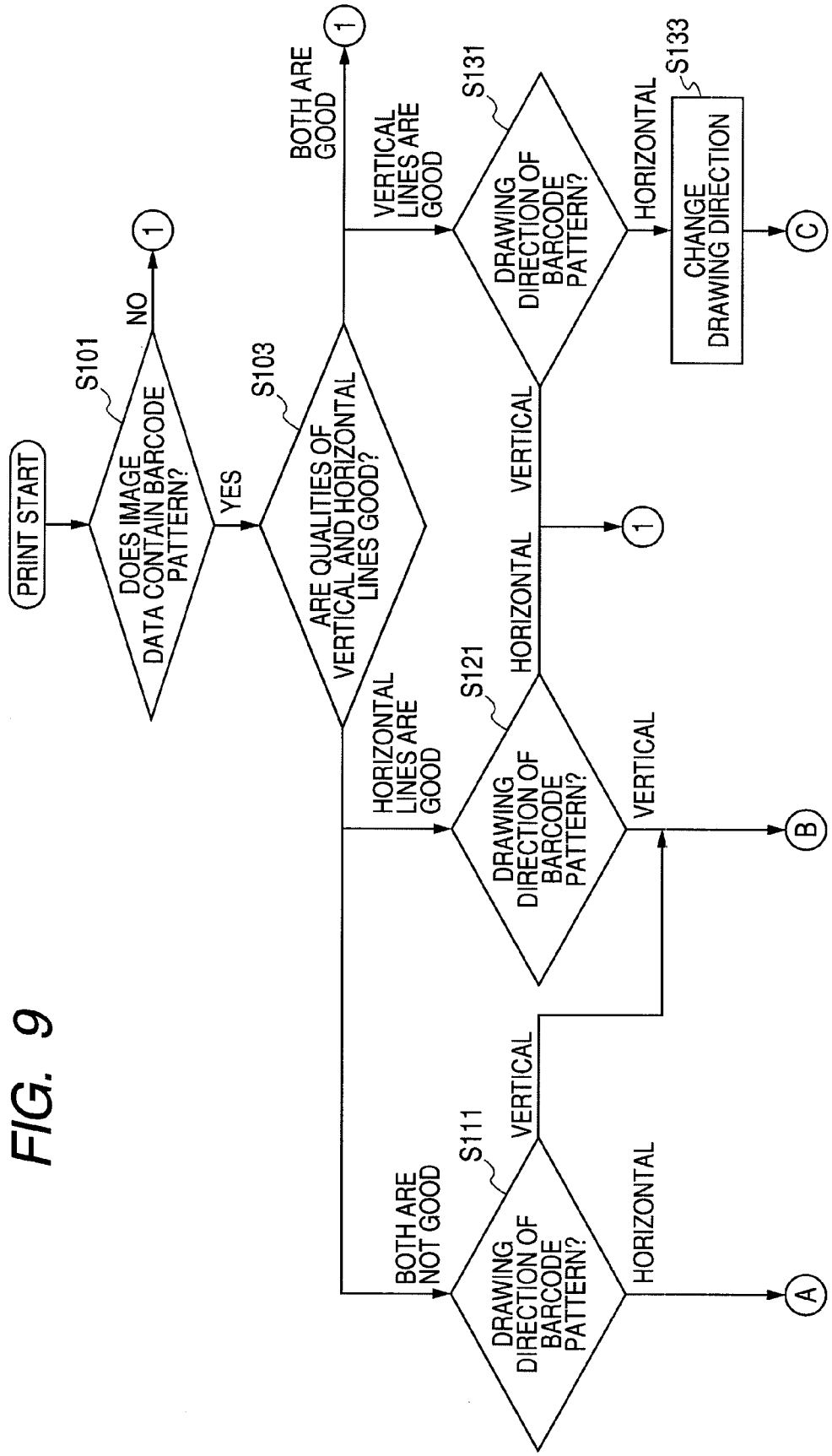
FIG. 9 is a flow chart showing a part of an operation of the image forming system S4 according to the fourth exemplary embodiment.
Figure 10:
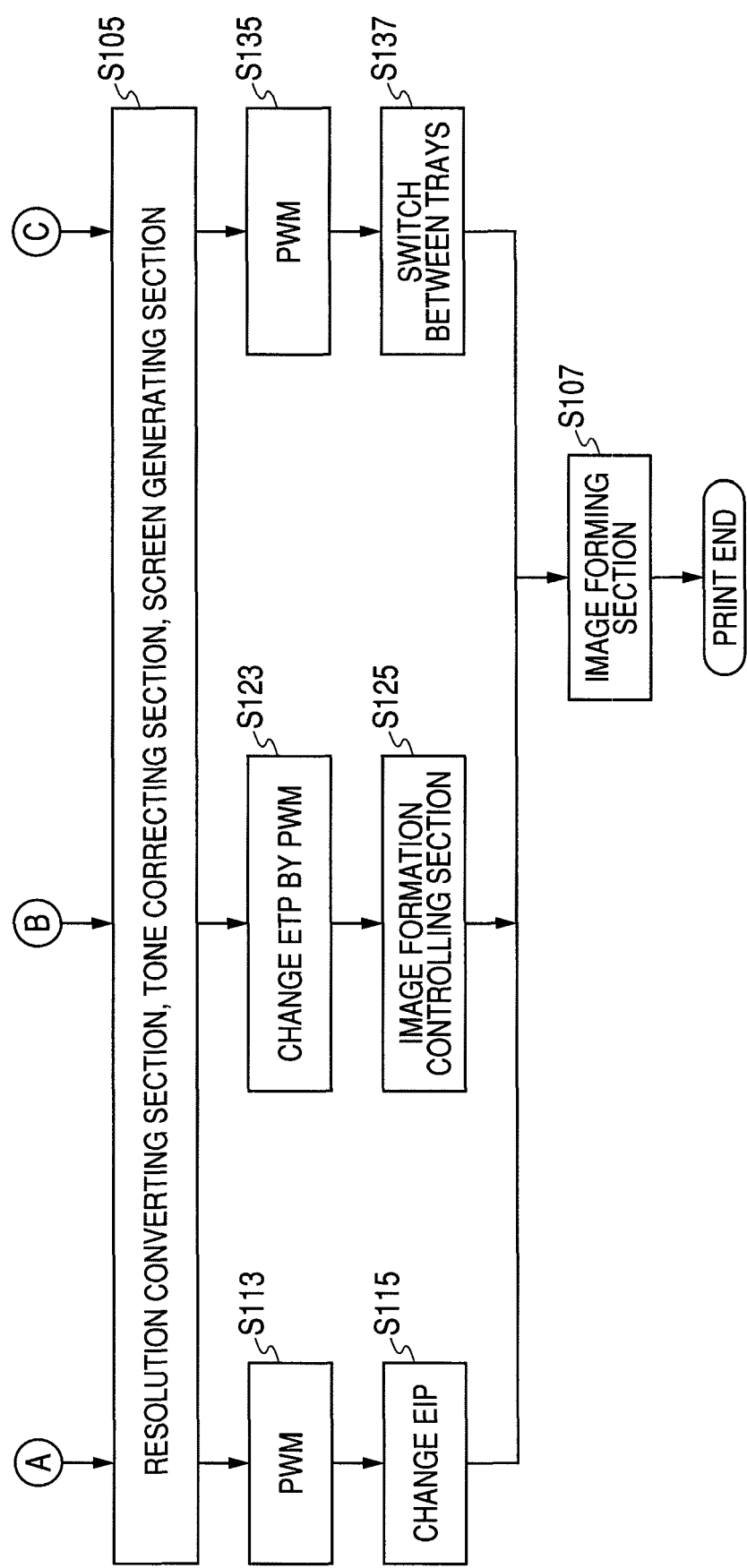
FIG. 10 is a flow chart showing another part of the operation of the image forming system S4 according to the fourth exemplary embodiment.

Turning back to step S101 shown FIG. 9, if the barcode pattern extracting section 303 determines that the image data contains a barcode pattern (Yes in S101), the process proceeds to step S103.

In step S103, the layout analyzing section 304 checks information of a drawing performance (drawing characteristic) of the image forming section 402, which is transmitted from the characteristic information storage section 803. Specifically, the layout analyzing section 304 determines, based on the information of the drawing performance (drawing characteristic) of the image forming section 402, (A) as to whether or not a quality of a barcode pattern formed of vertical lines drawn by the image forming section 402 satisfies a predetermined condition (e.g., the quality falls under grade A or B shown in Table 1) and (B) as to whether or not a quality of a barcode pattern formed of horizontal lines drawn by the image forming section 402 satisfies the predetermined condition. It is noted that the "vertical lines" are narrow lines parallel to the rotation direction of the drum or to the conveyance direction of the printing medium, and that the "horizontal lines" are narrow lines perpendicular to the rotation direction of the drum or to the conveyance direction of the printing medium.

In this exemplary embodiment, it is assumed that the information of the drawing performance (drawing characteristic) of the image forming section 402 are collected and stored in the characteristic information storage section 403 in advance. However, in a modified example, before the layout analyzing section 304 makes a determination in step S103, a toner image of a dummy barcode pattern may be formed on the intermediate transfer belt. Then, the optical sensor (e.g., one shown in FIG. 7) may detect the toner image of the dummy barcode pattern, and the layout analyzing section 304 may determine the information relating to the drawing performance (drawing characteristic) of the image forming section 402 based on the detection result of the optical sensor. Alternatively, a component other than the layout analyzing section may determine the information relating to the drawing performance (drawing characteristic) of the image forming section 402 based on the detection result of the optical sensor for store in the characteristic information storage section 403. Further alternatively, the information of the drawing performance (drawing characteristic) of the image forming section 402 may be collected at an arbitrary timing.

Turning back to step S103, if the layout analyzing section 304 determines that both of the quality of the vertical lines and the quality of the horizontal lines satisfy the predetermined condition (for example, the both qualities fall under the grade A or B shown in Table 1), the process proceeds to the normal image forming process shown in FIG. 11. The normal image forming process has already been described above, and thus the duplicate description will be omitted here.

If the layout analyzing section 304 determines that none of the quality of the vertical lines and the quality of the horizontal lines satisfies the predetermined condition (for example, the both qualities fall under any of the grades C to F shown in Table 1), the layout analyzing section 304 determines as to whether a drawing direction of the barcode pattern is the vertical direction or the horizontal direction (step S111). It is noted that the phrase "the drawing direction of the barcode pattern is the vertical direction" means that the barcode pattern is formed of the vertical narrow lines (for example, see the barcode shown in the left portion of FIG. 2B), and that the phrase "the drawing direction of the barcode pattern is the horizontal direction" means that the barcode pattern is formed of the horizontal narrow lines (for example, see the barcode shown in the left portion of FIG. 2A).

If the layout analyzing section 304 determines in step S111 that the drawing direction of the barcode pattern is the vertical direction, the process proceeds to step S123 through step S105 which will be described later.

If the layout analyzing section 304 determines in step S111 that the drawing direction of the barcode pattern is the horizontal direction, the process proceeds to step S113 through step S105. Step 105 is similar to steps 301 to 305 shown in FIG. 11. Thus, the duplicate description will be omitted here. The image data processed by the screen generating section 308 (in step S105) is transmitted to the laser controlling section 309. Also, step S113 is similar to step S307. Thus, the duplicate description will be omitted here. In step S115, the image formation controlling section 801 reads from the exposure intensity parameter storage section 405b the exposure intensity parameter corresponding to the case where the image data includes the barcode pattern formed of "the horizontal lines". In other words, the image formation controlling section 801 changes the exposure intensity of the laser output device of the image forming section 402 in accordance with (i) the qualities of the vertical and horizontal lines and (ii) the drawing direction of the barcode pattern.

Then, the image forming section 402 forms an image on a recording medium based on (i) the image data processed by the screen generating section 308, (ii) the exposure time parameter read out by the laser controlling section 309 in step S113 (that is, the exposure time parameter for the normal print) and (iii) the exposure intensity parameter read out by the image formation controlling section 801 in step S115 (step S107). The printing process is completed.

Turning back to step S103, if the layout analyzing section 304 determines that the quality of the horizontal lines satisfies the predetermined condition (for example, the quality falls under the grade A or B shown in Table 1) but the quality of the vertical lines does not satisfy the predetermined condition (for example, the quality falls under any of the grades C to F shown in Table 1), the process proceeds to step S121. In step S121, the layout analyzing section 304 determines as to whether the drawing direction of the barcode pattern is the vertical direction or the horizontal direction. If the layer out analyzing section 304 determines that the drawing direction of the barcode pattern is the horizontal direction, the process proceeds to the normal image forming process shown in FIG. 11. The normal image forming process has already been described above, and thus the duplicate description will be omitted here.

If the layer out analyzing section 304 determines in step 121 or step S111 that the drawing direction of the barcode pattern is the vertical direction, the process proceeds to step S123 through step S105. In step S123, the laser controlling section 309 reads from the exposure-time-parameter storage section 310b the exposure time parameter corresponding to the case where the image data includes the barcode pattern formed of "the vertical lines". In other words, the laser controlling section 309 changes the exposure time (or the pulse width) of the laser output device of the image forming section 402 in accordance with (i) the qualities of the vertical and horizontal lines and (ii) the drawing direction of the barcode pattern. Then, process proceeds to step S125. Step S125 is similar to step S309. Thus, the duplication description will be omitted here.

Then, the image forming section 402 forms an image on a recording medium based on (i) the image data processed by the screen generating section 308, (ii) the exposure time parameter read out by the laser controlling section 309 in step S123 and (iii) the exposure intensity parameter read out by the image formation controlling section 801 in step S125 (that is, the exposure intensity parameter for the normal print; step S107). The printing process is completed.

Turning back to step S103, if the layout analyzing section 304 determines that the quality of the vertical lines satisfies the predetermined condition (for example, the quality falls under the grade A or B shown in Table 1) but the quality of the horizontal lines does not satisfy the predetermined condition (for example, the quality falls under any of the grades C to F shown in Table 1), the process proceeds to step S131. In step S131, the layout analyzing section 304 determines as to whether the drawing direction of the barcode pattern is the vertical direction or the horizontal direction. If the layout analyzing section 304 determines that the drawing direction of the barcode pattern is the vertical direction, the process proceeds to the normal image forming process shown in FIG. 11. The normal image forming process has already been described above, and thus the duplicate description will be omitted here.

If the layer out analyzing section 304 determines that the drawing direction of the barcode pattern is the horizontal direction, the drawing direction changing section 705 changes the drawing direction of the barcode pattern from the horizontal direction (see the left portion of FIG. 2A) to the vertical direction (see the right portion of FIG. 2A; step S133). Then, the process proceeds to step S135 through step S105. Step S135 is similar to steps S113 and S307. Thus, the duplicate description will be omitted here. Then, the process proceeds to step S137. Step S137 is similar to steps S125 and 309, but is different in that the image formation controlling section 801 changes a tray to be used, for example, from the tray 202 to the tray 202b, which stores the printing sheets in the transverse direction.

Then, the image forming section 402 forms an image on a recording medium based on (i) the image data processed by the screen generating section 308, (ii) the exposure time parameter read out by the laser controlling section 309 in step S135 (that is, the exposure time parameter for the normal print) and (iii) the exposure intensity parameter read out by the image formation controlling section 801 in step S137 (that is, the exposure intensity parameter for the normal print; step S107). The printing process is completed. The exemplary embodiments of the invention made by the inventors have been described in detail. However, the exemplary embodiments described in this specification are just examples, and it should be understood that the invention is not limited to the disclosed technique. That is, the scope of the invention should not be interpreted to be limited to the foregoing embodiments, but be interpreted in accordance with the scope of the appended claims. Moreover, the scope of the invention includes the equivalents of the described technique of the claims and all modifications with the appended claims.

Furthermore, when a program is used, the program may be provided through a network or may be stored in a recording medium such as a CD-ROM.

The image forming apparatus, an image forming system, the image forming method, the computer-readable medium and the computer data signal according to any of the exemplary embodiments of the invention can be applied to an information processing apparatus such as a personal computer or a host computer; and a laser printer, a full-color printer, a complex machine, and a facsimile apparatus which have a network connection function.

What is claimed is:

1. An image forming apparatus comprising:
   a receiving unit that receives image data;
   an image forming unit that performs a predetermined image forming process based on the image data received by the receiving unit;
   a determining unit that determines as to whether or not the image data contains a barcode pattern;
   an analyzing unit, wherein when the determining unit determines that the image data contains the barcode pattern, the analyzing unit analyzes as to whether a drawing direction of the barcode pattern is a vertical direction or a horizontal direction;
   a control unit that controls, based on an analyzing result of the analyzing unit, the predetermined image forming process being performed for the barcode pattern by the image forming unit; and
   a drawing performance determining unit that determines information of drawing performance of the image forming unit, wherein
   the control unit controls the predetermined image forming process being performed for the barcode pattern, based on a determination result of the drawing performance determining unit.

2. The image forming apparatus according to claim 1, wherein the drawing performance determining unit includes a sensor that detects reproducibility of a barcode which is formed based on predetermined image data by the image forming unit during the predetermined image forming process.

3. The image forming apparatus according to claim 2, wherein the sensor is an image sensor that optically detects the barcode.

4. The image forming apparatus according to claim 2, wherein
   when the drawing performance determining unit determines that the reproducibility of the barcode detected by the sensor satisfies a condition which is set in advance regardless of the vertical and horizontal drawing directions, the control unit forms an image of the barcode pattern in accordance with a normal image forming process which is set to image data containing no barcode pattern, in advance.

5. The image forming apparatus according to claim 2, wherein
   when the drawing performance determining unit determines that the reproducibility of the barcode detected by the sensor satisfies a condition, which is set in advance, in one of the vertical and horizontal drawing directions, the control unit forms an image of the barcode pattern in accordance with the predetermined image forming process, which is set in association with the one of the vertical and horizontal drawing directions satisfying the condition.

6. The image forming apparatus according to claim 5, wherein the predetermined image forming process includes a process of changing a layout of the barcode pattern.

7. The image forming apparatus according to claim 2, wherein
   the image forming unit includes medium storing units that store media used in the predetermined image forming process, in association with the respective drawing directions, and
   when the drawing performance determining unit determines that the reproducibility of the barcode detected by the sensor satisfies a condition, which is set in advance, in one of the vertical and horizontal drawing directions, the control unit switches between the medium storing units in accordance with the drawing direction satisfying the condition.

8. The image forming apparatus according to claim 2, wherein when the drawing performance determining unit determines that the reproducibility of the barcode detected by the sensor does not satisfy a condition, which is set in advance, in any of the vertical and horizontal drawing directions, the control unit forms an image of the barcode pattern in accordance with the predetermined image forming process.

9. The image forming apparatus according to claim 1, wherein the determining unit analyzes a predetermined control command which is assigned to the image data and which indicates as to whether or not the barcode pattern is present, so as to determine as to whether or not the image data contains the barcode pattern.

10. An image forming system comprising:
at least one image forming apparatus according to claim 1; and
at least one information processing apparatus that is connected to the at least one image forming apparatus through a communication unit.

11. An image forming apparatus comprising:
a receiving unit that receives image data
an image forming unit that performs a predetermined image forming process based on the image data received by the receiving unit;
a determining unit that determines as to whether or not the image data contains a barcode pattern;
an analyzing unit, wherein when the determining unit determines that the image data contains the barcode pattern, the analyzing unit analyzes as to whether a drawing direction of the barcode pattern is a vertical direction or a horizontal direction;
a control unit that controls, based on an analyzing result of the analyzing unit, the predetermined image forming process being performed for the barcode pattern by the image forming unit; and
a drawing-performance-information storing unit that stores information relating to drawing performance of the image forming unit, wherein
the control unit controls the predetermined image forming process being performed for the barcode pattern, based on the analyzing result of the analyzing unit and the information relating to the drawing performance of the image forming unit.

12. An image processing method comprising:
receiving image data;
performing a predetermined image forming process based on the received image data;
determining as to whether or not the image data contains a barcode pattern;
when it is determined that the image data contains the barcode pattern, analyzing as to whether a drawing direction of the barcode pattern is a vertical direction or a horizontal direction; and
controlling, based on an analyzing result, the predetermined image forming process that is performed for the barcode pattern,
determining a drawing performance of the predetermined image forming process, wherein
the controlling of the predetermined image forming process for the barcode pattern, based on a determination result of the drawing performance.

13. A non-transitory computer readable medium for enabling a computer to perform image processing, the image processing comprising:
receiving image data;
performing a predetermined image forming process based on the received image data;
determining as to whether or not the image data contains a barcode pattern;
when it is determined that the image data contains the barcode pattern, analyzing as to whether a drawing direction of the barcode pattern is a vertical direction or a horizontal direction; and
controlling, based on an analyzing result, the predetermined image forming process that is performed for the barcode pattern;
determining a drawing performance of the image forming process, wherein
controlling of the predetermined image forming process for the barcode pattern, based on a determination result of the drawing performance.

14. An image forming apparatus comprising:
a receiving unit that receives image data;
an image forming unit that performs a predetermined image forming process based on the image data received by the receiving unit;
a determining unit that determines as to whether or not the image data contains a barcode pattern;
an analyzing unit, wherein when the determining unit determines that the image data contains the barcode pattern, the analyzing unit analyzes as to whether a drawing direction of the barcode pattern is a vertical direction or a horizontal direction; and
a control unit that controls, based on an analyzing result of the analyzing unit, at least one of an orientation of the image data, an exposure time of a laser used to reproduce the image data, and a laser intensity of the laser used to reproduce the image data.

* * * * *